(12) United States Patent
Yeum et al.

(10) Patent No.: US 8,408,616 B2
(45) Date of Patent: Apr. 2, 2013

(54) GRIPPER FOR TAILGATE OF VEHICLES

(75) Inventors: Jung Whan Yeum, Seoul (KR); Doo Il Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 213 days.

(21) Appl. No.: 12/846,981

(22) Filed: Jul. 30, 2010

(65) Prior Publication Data
US 2011/0135436 A1   Jun. 9, 2011

(30) Foreign Application Priority Data

Dec. 4, 2009  (KR) .......................... 10-2009-0120099

(51) Int. Cl.
*B25J 15/10* (2006.01)
(52) U.S. Cl. .................. 294/86.4; 294/81.2; 294/197
(58) Field of Classification Search ................ 294/86.4, 294/81.2, 81.61, 192, 197, 65, 86.1; 901/37, 901/39; 414/736, 729
See application file for complete search history.

(56) References Cited

U.S. PATENT DOCUMENTS

| 4,453,873 | A | * | 6/1984 | Curti | 414/796.9 |
| 5,127,695 | A | * | 7/1992 | Zoeten | 294/67.33 |
| 5,271,651 | A | * | 12/1993 | Blatt et al. | 269/71 |
| 6,273,483 | B1 | * | 8/2001 | Bone | 294/86.4 |
| 6,722,842 | B1 | * | 4/2004 | Sawdon et al. | 414/729 |
| 7,100,955 | B2 | * | 9/2006 | Nakamura | 294/65 |
| 7,267,383 | B2 | * | 9/2007 | Bilsing | 294/65 |

FOREIGN PATENT DOCUMENTS

| JP | 11-188553 A | 7/1999 |
| KR | 10-2009-0053078 A | 5/2009 |

* cited by examiner

*Primary Examiner* — Dean Kramer
(74) *Attorney, Agent, or Firm* — Edwards Wildman Palmer LLP; Peter F. Corless

(57) ABSTRACT

Featured is a gripper for a tailgate; such a gripper includes a rotation pad at each regulation surface of a locator and a clamper of each clamping unit, where a swivel ball is mounted on the rotation pad. Each clamping unit is movable in a vertical direction or a horizontal direction by a movement unit of a frame so as to be adaptable to angle differences of each regulation surface of the tailgate. Such a tailgate gripper further includes a frame having a tool mounting portion to mount a tool changer of a robot in a lower portion of a rear surface thereof.

20 Claims, 9 Drawing Sheets

US 8,408,616 B2

GRIPPER FOR TAILGATE OF VEHICLES

CROSS-REFERENCE TO RELATED APPLICATION

This application claims priority to and the benefit of Korean Patent Application No. 10-2009-0120099 filed in the Korean Intellectual Property Office on Dec. 4, 2009, the entire contents of which are incorporated herein by reference.

BACKGROUND OF THE INVENTION (a) Field of the Invention

The present invention relates to a gripper for a tailgate. More particularly, the present invention relates to a gripper for a tailgate that can be commonly applied to a tailgate of a plurality of vehicle kinds.

(b) Description of the Related Art

Grippers are typically used to transfer a vehicle body component from a pre-process to a post-process in a vehicle body assemble line and also can be used to fix them to be welded by a welding device. As shown in FIG. 1, such a gripper 5 also can be mounted to the front end of an arm 3 of a robot 1, and thus, is often called a robot gripper.

In FIG. 1, reference numeral "7" indicates a welding device, and reference numeral "9a" a door of a vehicle body.

There is shown in FIG. 2 a conventional gripper 5 for a tailgate. Such a conventional gripper 5 for a tailgate includes eight clamping units 13a that are disposed on a frame mounted at a front end of an arm 3 of the robot 1. Such conventional grippers are only designed for each kind of vehicle, and include a variable clamping unit 17 where five sliding cylinders 15a are applied.

However, the conventional gripper 5 for a tailgate can apply the sliding cylinder 15a as well as the variable clamping unit 17 to correspond to a plurality of vehicle kinds, where angles or heights of a regulation surface of a vehicle body component per vehicle kind are different, or a shape of the regulation surface is complicated or the regulation surface interferes with existing facilities. However, when the gripper having the variable clamping unit 17, and the sliding cylinder 15a cannot correspond, another gripper is manufactured so as to be able to correspond to a variety of vehicle components.

Creating an individual gripper for a new kind of vehicle causes the manufacturing cost to rise, and when the gripper is remodeled, the structure thereof becomes complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention features a gripper for a tailgate having advantages of being commonly applied to a variety of doors of vehicles. Such a gripper includes plurality of clamping units, where a rotation pad is disposed at each regulation surface of a locator and a clamper of each clamping unit, where a swivel ball is mounted on the rotation pad. Each clamping unit is movable in a vertical direction or a horizontal direction by a movement means of a frame so as to be adaptable to angle differences of each regulation surface of a tailgate for a vehicle.

In one embodiment of the present invention, a gripper for a tailgate includes a frame having a tool mounting portion to mount a tool changer of a robot in a lower portion of a rear surface thereof. Such a gripper also includes a vertical movement means that moves a sliding bracket along a guide rail in a vertical direction by an electric cylinder in an upper portion of the frame. Also included is a first clamping unit that is arranged so as to be moved in a vertical direction on an upper portion of the frame through the sliding bracket of the vertical movement means to make a first clamper regulate an upper middle part of a tailgate by a first clamping cylinder through the first locator. Such a gripper also includes a horizontal movement means that respectively moves each sliding bracket in a horizontal direction along each guide rail by each electric cylinder at both lower sides of the frame, and second and third clamping units that are arranged so as to be respectively moved in a horizontal direction at both lower sides of the frame through each sliding bracket of both horizontal movement means to make second and third clampers regulate both lower sides of the tailgate by second and third clamping cylinders through second and third locators.

In further embodiments, the vertical movement means includes a vertical guide rail that is disposed in a vertical direction of the frame, a vertical sliding bracket that is disposed to be slidable in a vertical direction on the vertical guide rail through a slider, and a vertical electric cylinder that is disposed on the frame in a vertical direction corresponding to one side of the vertical guide rail. The front end of the operating rod of the vertical electric such a cylinder is connected to the vertical sliding bracket through a connecting bracket.

The front end of the operating rod of the vertical electric cylinder may be connected to the connecting bracket through a floating joint.

In further embodiments, the first clamping unit includes a first locator that is mounted at a forward part of the vertical sliding bracket, a first clamping cylinder one end of which is connected to a lower side of the first locator through a hinge, and a first clamper one side of which is connected to a front end portion of the first locator through a hinge and the other side is connected to a rod front end of the first clamping cylinder through a hinge.

In further embodiments, a rotation pad is disposed at each regulation surface of the first locator and the first clamper, and a swivel ball that is rotatable within a predetermined range, is mounted in the rotation pad.

In yet further embodiments, the first clamping cylinder is a hydraulic cylinder operated by a fluid and in more particular embodiments, the first clamping cylinder is a pneumatic cylinder that uses compressed air as the operational pressure.

In yet further embodiments, the horizontal movement means respectively includes horizontal direction guide rails that are disposed in a horizontal direction at both lower sides of the frame, horizontal direction sliding brackets that are respectively slidably disposed on horizontal direction guide rails in a horizontal direction through a slider, and horizontal direction electric cylinders that are respectively disposed at upper and lower sides of the frame between the horizontal direction guide rails in a horizontal direction. The front end of operating rods thereof are respectively connected to the horizontal direction sliding brackets through a connecting bracket.

In further embodiments, the front end of each operating rod of the horizontal direction electric cylinders is respectively connected to the connecting bracket through a floating joint.

In further embodiments, the second and third clamping units include second and third locators that are disposed at the forward side of each horizontal direction sliding bracket, second and third clamping cylinders one end of which is respectively connected to one side of the second and third locators through a hinge, and second and third clampers one side of which is respectively connected to a front end portion of the second and third locators through a hinge and the other side thereof is respectively connected to the front end of a rod of the second and third clamping cylinders by a hinge.

In yet further embodiments, a rotation pad is disposed at each regulation surface of the second and third locators and the second and third clampers. Also, a swivel ball that is rotatable in a predetermined range, is disposed in the rotation pad.

In yet further embodiments, the second and third clamping cylinders are hydraulic cylinders operated by a fluid and in more particular embodiments, the second and third clamping cylinders are pneumatic cylinders that use compressed air as the fluid.

The gripper for a tailgate of the present invention as described herein is advantageous in that it can be used for a variety of doors of vehicles, as (a) the rotation pad is disposed at each regulation surface of the locator and the clamper of each clamping unit, (b) the swivel ball is mounted on the rotation pad, and (c) each clamping unit is movable in a vertical direction or a horizontal direction by the movement means so as to correspond to angle differences of each regulation surface of the tailgate for a vehicle.

Other aspects and embodiments of the present invention are described herein.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE EMBODIMENTS

As described further herein, the present invention features a gripper for a tailgate, that includes a frame, a first clamping unit, a vertical movement means, second and third clamping units and a horizontal movement means. The first clamping unit includes a first clamper. The first clamping unit is configured so the first clamper regulates an upper portion of a tailgate. The vertical movement means is operably coupled to the frame and the first clamping unit. Also, the vertical movement means is configured to move the first clamping unit in a vertical direction so that the first clamper regulates the upper portion of a tailgate.

The second and third clamping units are configured so as to be respectively moved in a horizontal direction at both lower sides of the frame through each sliding bracket of the horizontal movement means so the second and third clampers regulate lower sides of the tailgate by second and third clamping cylinders through second and third locators. The horizontal movement means is operably coupled to the frame and respectively to the second and third clamping units. Also, the horizontal movement means is configured so as to cause the second and third clamping units to move in a horizontal direction so that the second an third clampers regulate lower sides of the tailgate.

In further embodiments, the frame at a lower portion and rear surface thereof, includes a tool mounting portion which is configured for mounting to a tool changer of a robot. In yet further embodiments, the vertical movement means includes a sliding bracket, a guide rail and an electric cylinder, where the sliding bracket moves along the guide rail in the vertical direction by the electric cylinder disposed in an upper portion of the frame.

In further embodiments, the first clamping unit is arranged so as to be moved in a vertical direction on an upper portion of the frame through the sliding bracket of the vertical movement means to make a first clamper regulate an upper middle of a tailgate by the first clamping cylinder through the first locator.

In further embodiments, the horizontal movement means includes a plurality of sliding bracket, a plurality of guide rails and a plurality of electric cylinders, where the horizontal movement means is arranged so each sliding bracket is moved in a horizontal direction along each guide rail by each electric cylinder at both lower sides of the frame. In yet further embodiments, the second and third clamping units are arranged so as to be respectively moved in a horizontal direction at both lower sides of the frame through each sliding bracket of both horizontal movement means so the second and third clampers regulate lower sides of the tailgate by second and third clamping cylinders through second and third locators.

Figure 1:
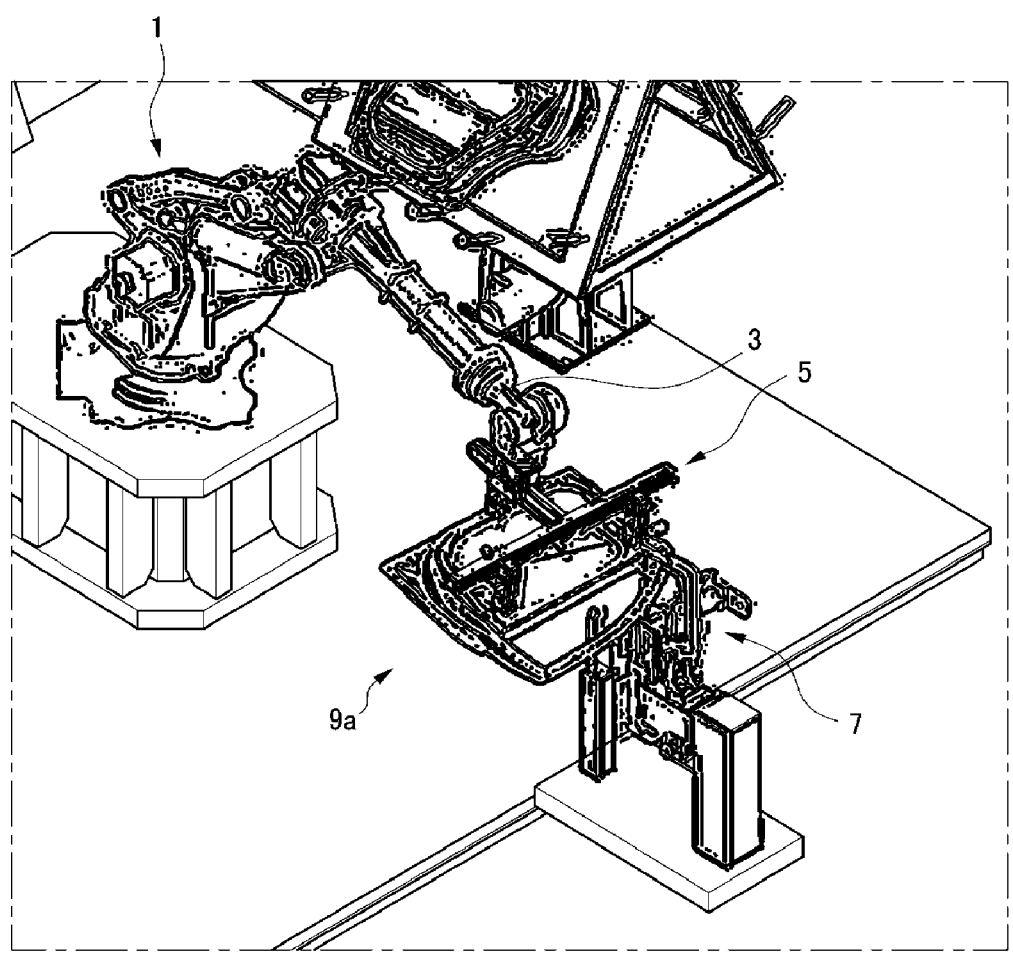
FIG. 1 is an illustrative view of a welding process of a door where a conventional gripper is being used.
Figure 2:
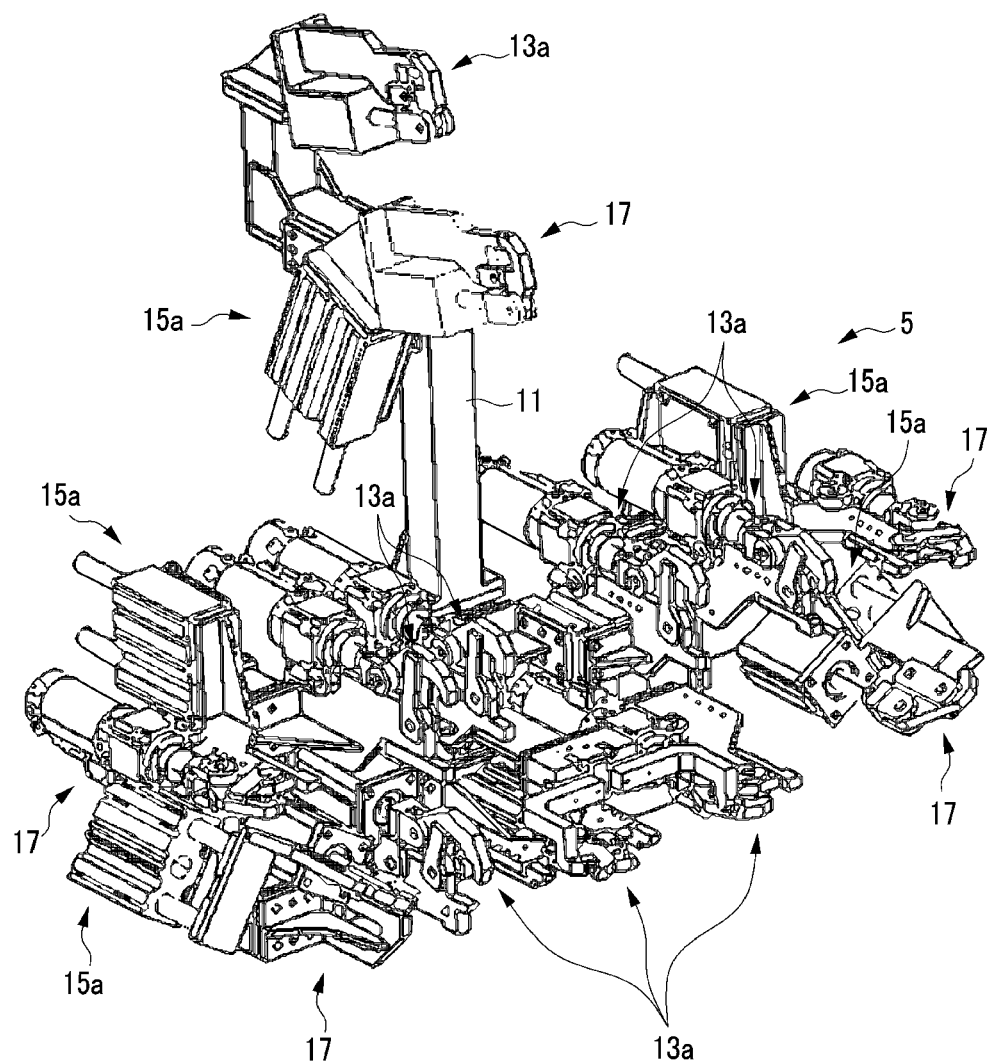
FIG. 2 is a perspective view of another conventional griper for a tailgate.
Figure 3:
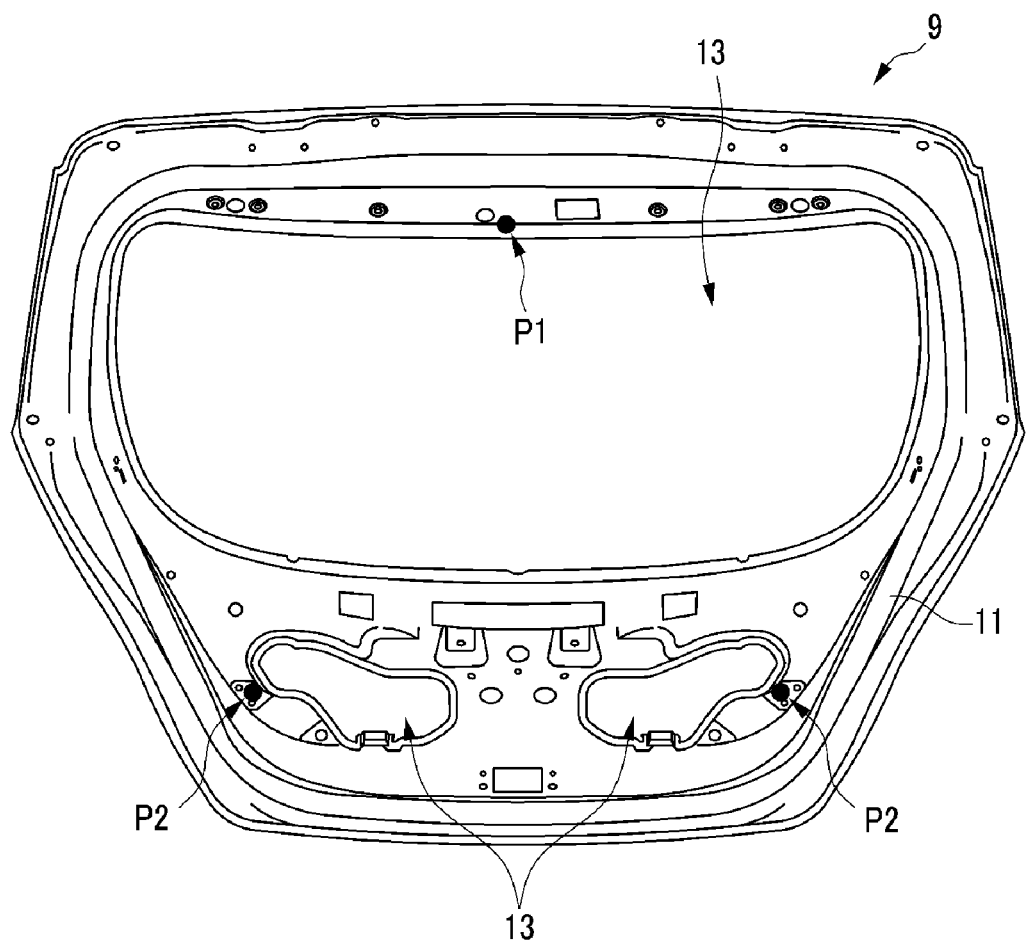
FIG. 3 is a rear view showing a clamping point(s) of a gripper for a tailgate according to the present invention.
Figure 4:
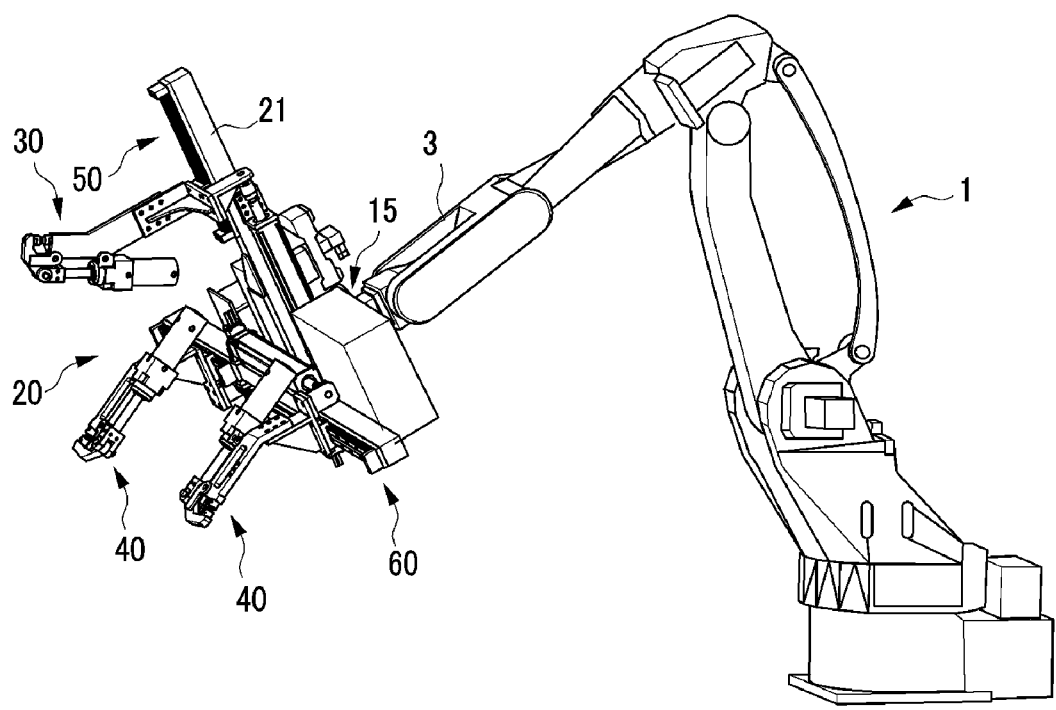
FIG. 4 is a perspective view of a gripper for a tailgate according to the present invention installed on a robot.
Figure 5:
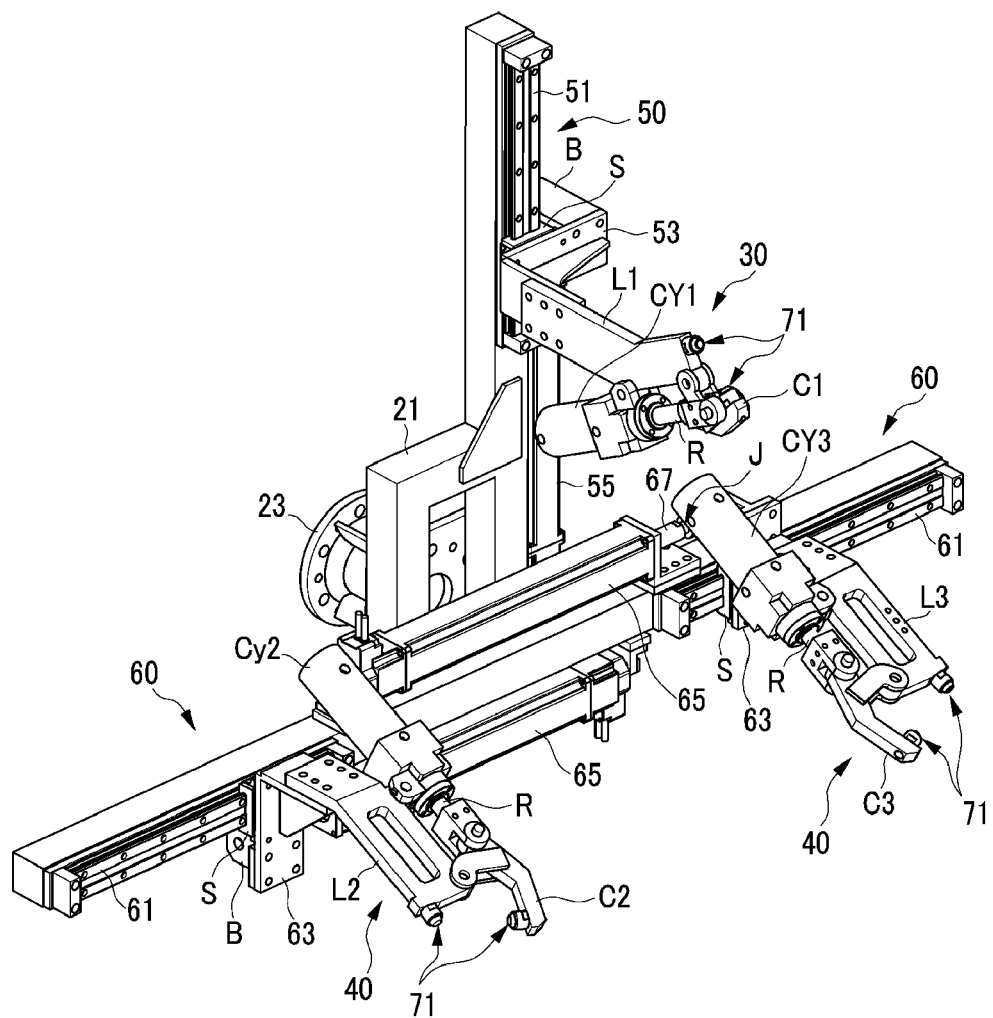
FIG. 5 and FIG. 6 are perspective views of a gripper for a tailgate according to the present invention.
Figure 6:
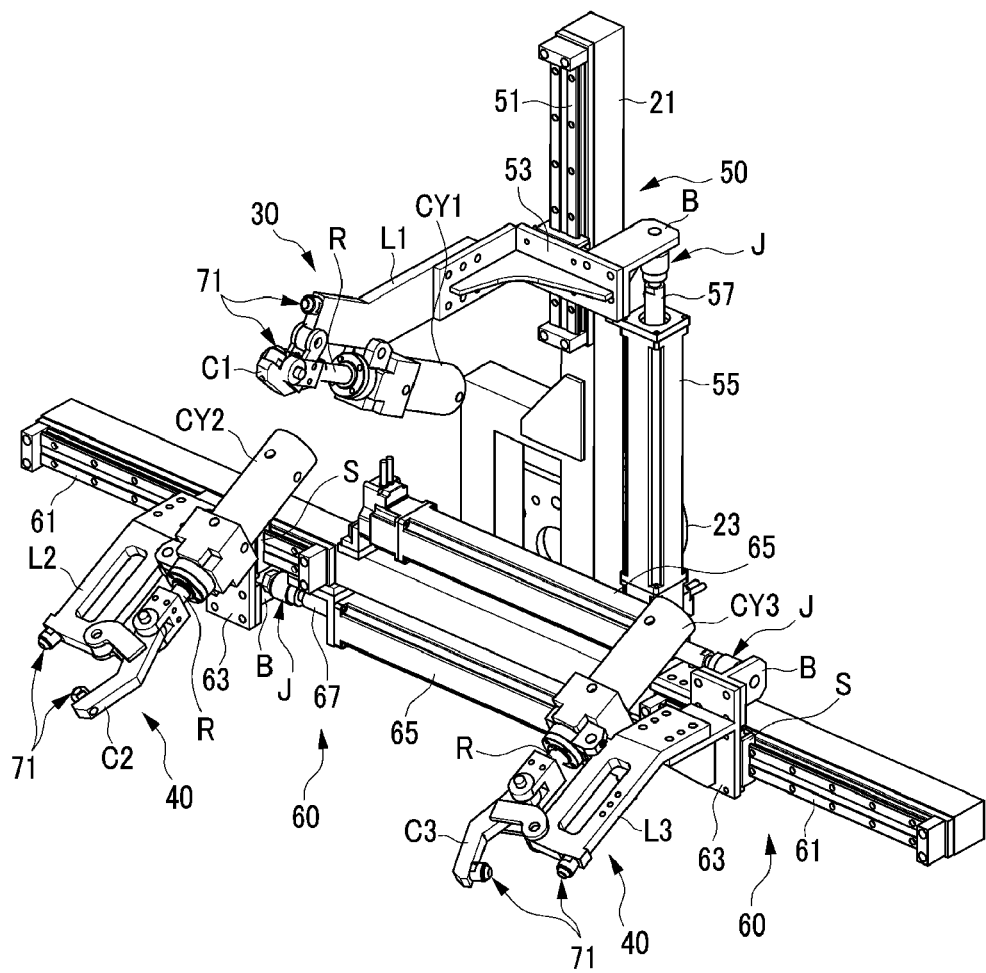

Now referring to FIGS. 3-6, there is shown a gripper 20 for a tailgate (hereinafter "tailgate gripper") according to particular aspects/embodiments of the present invention. In FIG. 3 there is shown a rear view of a door showing clamping point(s) for a tailgate gripper 20 according to the present invention, and FIG. 4 provides a perspective view of a tailgate gripper according to the present invention when mounts to, or installed on a robot. FIG. 5 and FIG. 6 are perspective views of a tailgate gripper according to the present invention such as that shown in FIG. 4. Reference should be made to one of FIGS. 3-6 in the following discussion.

As shown in FIG. 3 a tailgate 9 for use with a tailgate gripper 20 for a tailgate 9 of the present invention includes an upper clamping point P1 and lower clamping points P2 respectively corresponding to the upper center and both lower sides of an opening 13 of an inner panel 11 on a rear surface of a tailgate 9.

The tailgate gripper 20, as shown in FIG. 4, is configured so as to include a mating or mounting structure at a rear side of the frame 21 that is configurable so as to be attached to a tool changer 15 that is arranged at the front end of an arm 3 of a robot 1.

The tailgate gripper 20, as shown in FIG. 5 and FIG. 6, includes a basic frame 21, a first upper side clamping unit 30 corresponding to the upper clamping point P1, and second and third lower side clamping units 40 corresponding to the lower clamping points P2.

The first clamping unit 30 is mounted on the upper portion of the frame 21 through vertical movement means 50, and the second and third clamping units 40 are respectively mounted on both lower sides of the frame 21 through horizontal movement means 60.

As indicated above, the frame 21 is configured so as to include a tool mounting portion 23 at a lower side of a rear surface of the frame 21. As also indicated above, the tool changer 15 of the robot 1 is mounted on the tool mounting portion 23.

The vertical movement means 50 is disposed at an upper portion of the frame 21 so as to move a sliding bracket along a guide rail in a vertical direction by an electric cylinder, and includes a vertical guide rail 51 that is mounted on the frame 21 in a vertical direction. The vertical sliding bracket 53 is disposed on the vertical guide rail 51 through a slider (S) to be slidable in a vertical direction.

Further, a vertical electric cylinder 55 is disposed at one side of the vertical guide rail 51 in a vertical direction of the frame 21. The front end of an operating rod 57 of the vertical electric cylinder 55 is connected to the vertical sliding bracket 53 through a connecting bracket (B).

Figure 7:
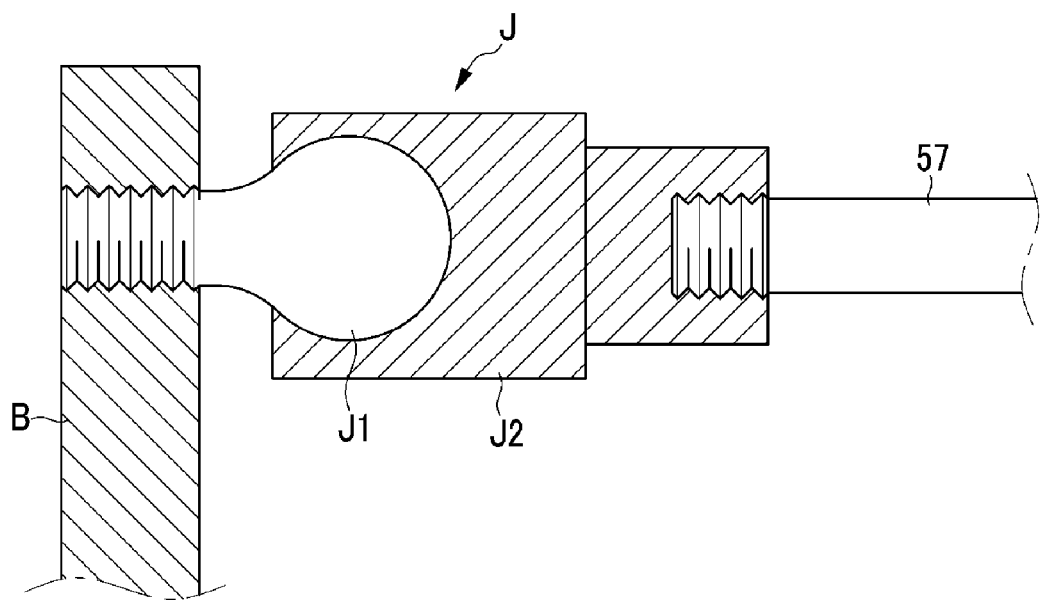
FIG. 7 is a cross-sectional view of a floating joint for a gripper for a tailgate according to the present invention.

In further embodiments and with reference also to FIG. 7, the front end of the operating rod 57 of the vertical electric cylinder 55 is connected to the connecting bracket (B) through a floating joint (J) so as to eliminate a load applied to the vertical electric cylinder 55 in a case that the operating rod 57 of the vertical electric cylinder 55 is not parallel to the vertical guide rail 51.

Such a floating joint (J) is arranged so a rotation ball J1 fixed on the connecting bracket (B), is rotatably inserted into a joint housing J2 mounting on the front end of the operating rod 57 of the vertical electric cylinder 55.

In further embodiments, the first clamping unit 30 is disposed so as to be moved in a vertical direction of the frame 21 at the vertical sliding bracket 53 of the vertical movement means 50. The first clamper C1 regulates the upper clamping point P1 of the upper center part of the tailgate 9 against the first locator L1 by the first clamping cylinder CY1.

Also, in the first clamping unit 30, the first locator L1 is extended in a forward direction of the vertical sliding bracket 53, and one end of the first clamping cylinder CY1 is connected to a lower side of the first locator L1 through a hinge.

In addition, one side of the first clamper C1 is connected to a front end portion of the first locator L1 by a hinge, and the other side of the first clamper C1 is connected to the front end of a rod (R) of the first clamping cylinder CY1 by a hinge.

Figure 8:
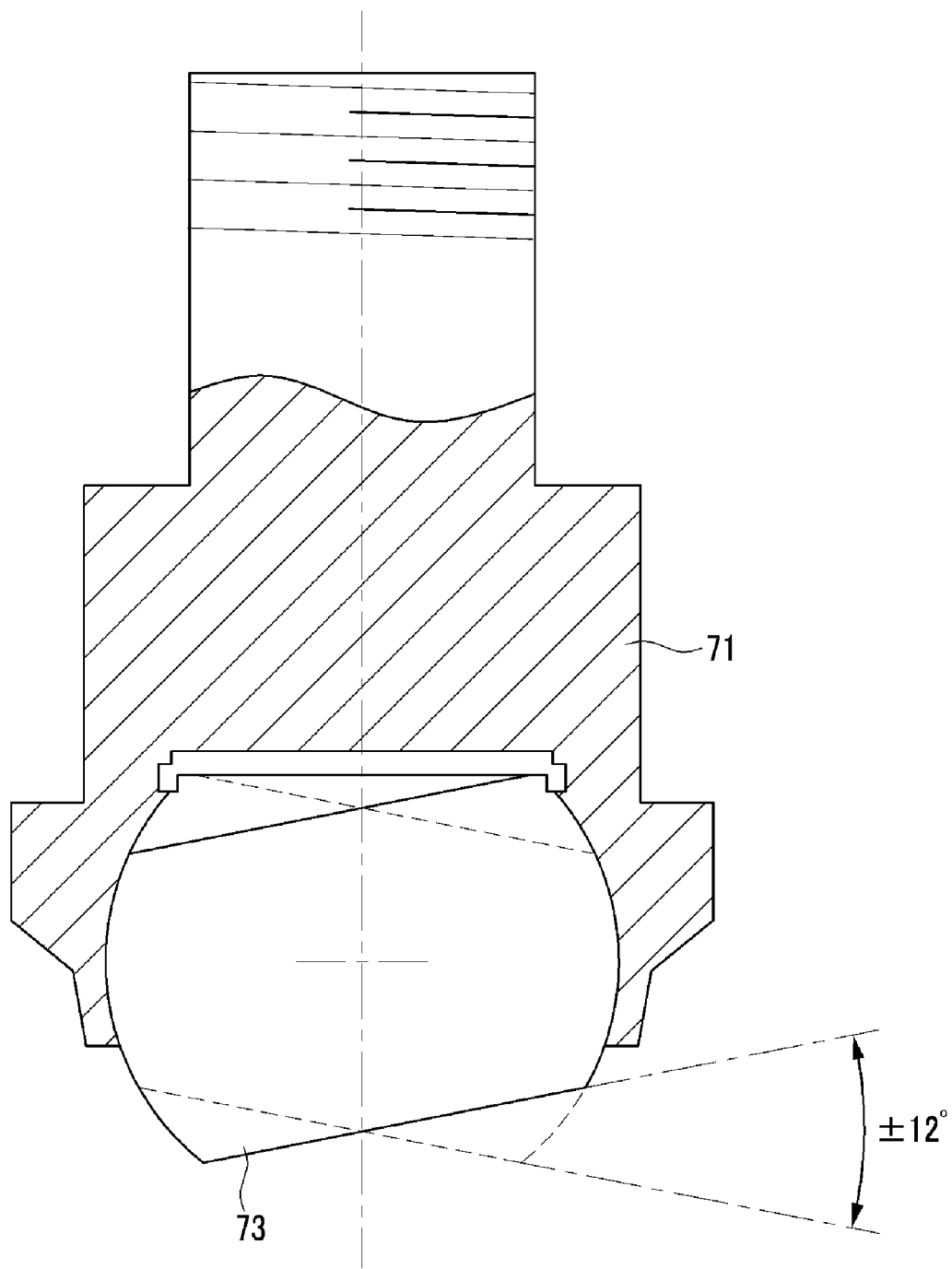
FIG. 8 is a cross-sectional view of a rotation pad for a gripper for a tailgate according to the present invention.

In further embodiments and with reference to FIG. 8, a rotation pad 71 where a swivel ball 73 is arranged so as to be rotatable in a predetermined range, is formed at a regulation surface of the first locator L1 and the first clamper C1.

In further embodiments, the upper clamping cylinder CY1 is a hydraulic cylinder such as those known to those skilled in the art that is operated using a pressurized fluid. Preferably, the upper clamping cylinder CY1 is a pneumatic cylinder that uses pressurized air or other gas as the operational pressure for operating the cylinder.

In further embodiments, both sides of the horizontal movement means 60 are arranged at both lower sides of the frame 21 so as to move in a horizontal direction along a guide rail of a sliding bracket by the electric cylinder. In other words, the horizontal direction guide rails 61 are disposed at both lower sides of the frame 21 in a horizontal direction of the horizontal movement means 60.

Also, a horizontal direction sliding bracket 63 is respectively mounted on each horizontal direction guide rail 61 to slide in an horizontal direction through a slider (S).

In further embodiments, horizontal direction electric cylinders 65 are respectively disposed at an upper side and a lower side of a lower portion of the frame 21 between the horizontal direction guide rails 61 in a horizontal direction. The front end of each operating rod 67 of the horizontal direction electric cylinder 65 is connected to each horizontal direction sliding bracket 63 through a connecting bracket (B).

More particularly, the front end of each operating rod 67 of each horizontal direction electric cylinder 65 is connected to the connecting bracket (B) through the floating joint (J), and eliminates a load applied to each horizontal direction electric cylinder 65 when an operating rod 67 of each horizontal direction electric cylinder 65 is not parallel to each horizontal direction guide rail 61.

In yet further embodiments, the second and third clamping units 40 are respectively arranged on the horizontal direction sliding bracket 63 at both sides of the horizontal movement means 60 so as to be moved at both lower sides of the frame 21 in a horizontal direction.

In further embodiments, the second and third clamper C2 and C3 respectively regulate a lower clamping point(s) P2 of both lower sides of the tailgate 9 against the second and third locator L2 and L3 by the second and third clamping cylinder CY2 and CY3.

In the second and third clamping units 40, the second and third locators L2 and L3 are extended in a forward direction of each horizontal direction sliding bracket 63.

Also, one end portion of each of the second and third clamping cylinders CY2 and CY3 is respectively connected to one side of the second and third locators L2 and L3 through a hinge.

In further embodiments, each side of the second and third clampers C2 and C3 is respectively connected to a front end portion of the second and third locators L2 and L3 through a hinge, and the other side thereof is connected to a front end of a rod (R) of the second and third clamping cylinders CY2 and CY3, respectively, through a hinge.

In further embodiments, each of the second and third clamping cylinders CY2, CY3 1 is a hydraulic cylinder such as those known to those skilled in the art that is operated using a pressurized fluid. Preferably, each of the second and third clamping cylinders CY2, CY3 is a pneumatic cylinder that uses pressurized air or other gas as the medium for operating the cylinder.

In further embodiments and with reference to FIG. 8, in the regulation surface of the second and third locators L2 and L3 and the second and third clampers C2 and C3 the rotation pad 71 is respectively disposed at a regulation surface of the first locator L1 and the first clamper C1, and a swivel ball 73 that is rotatable within about 12° degrees is applied to the rotation pad 71 so as to correspond to different angles of the regulation surface.

Figure 9:
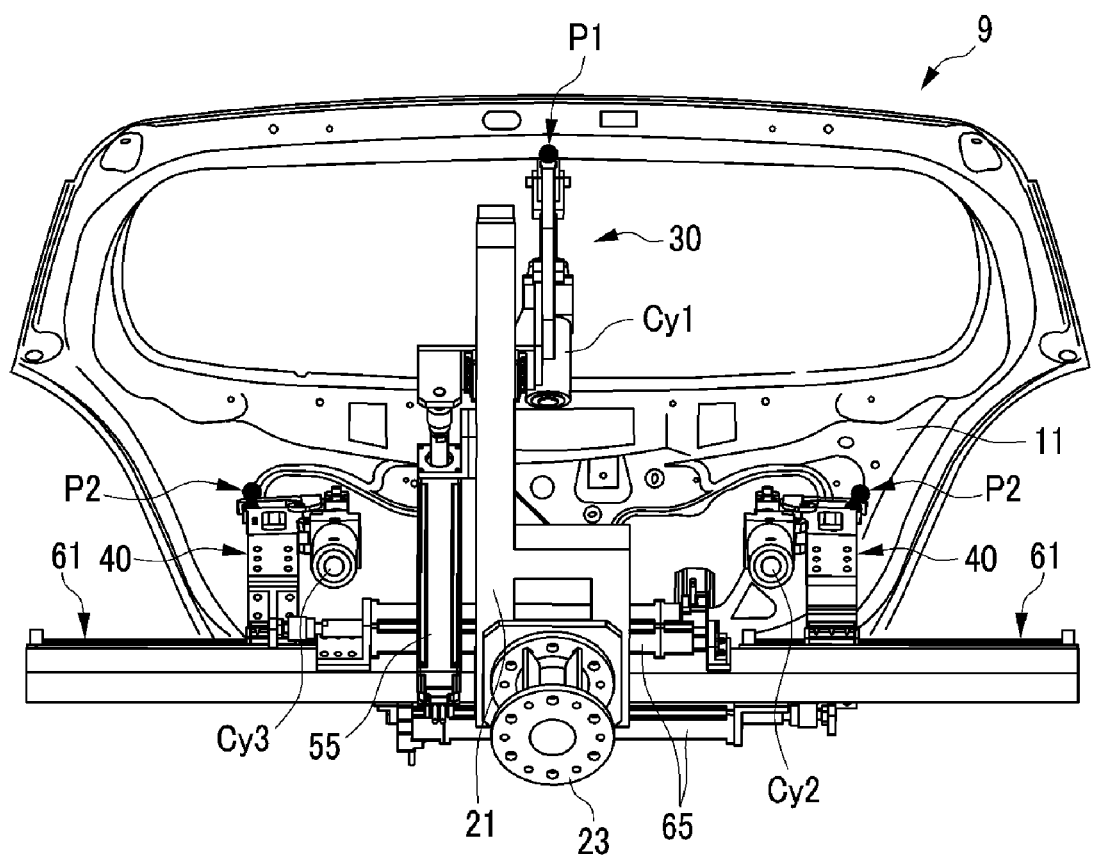
FIG. 9 is a perspective view of a gripper for a tailgate according to the present invention when clamped to the tailgate.

Now referring to FIG. 9 and as indicated herein, in the tailgate gripper 20 the first clamper C1 and the first locator L1 regulate the upper clamping point P1 of the inner panel 11 of the tailgate 9 by the first clamping cylinder CY1 of the first clamping unit 30, and the second and third clampers C2 and C3 and the second and third locator L2 and L3 regulate both lower clamping points P2 of the inner panel 11 of the tailgate 9 by the second and third clamping cylinders CY2 and CY3 of the second and third clamping units 40.

The tailgate gripper 20 operates both horizontal direction electric cylinders 65 to adjust the distance between the second and third clamping units 40 so as to correspond to the position of the lower clamping points P2 in a case that the tailgate 9 is changed to a different size. Also, the vertical electric cylinder 55 is operated to adjust the vertical direction of the first clamping unit 30 with respect to the second and third clamping units 40 so as to correspond to heights of a new upper clamping point P1 and new lower clamping points P2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gripper for a tailgate, comprising:
   a frame at which a tool mounting portion is disposed to mount a tool changer of a robot in a lower portion of a rear surface thereof;
   a vertical movement means that moves a sliding bracket along a guide rail in a vertical direction by an electric cylinder in an upper portion of the frame;
   a first clamping unit that is prepared to be moved in a vertical direction on an upper portion of the frame through the sliding bracket of the vertical movement means to make a first clamper regulate an upper middle of a tailgate by a first clamping cylinder through a first locator;
   horizontal movement means that respectively move the sliding bracket in a horizontal direction along the guide rail by the electric cylinder at both lower sides of the frame; and
   second and third clamping units that are prepared to be respectively moved in a horizontal direction at both lower sides of the frame through each sliding bracket of both horizontal movement means to make second and third clampers regulate lower sides of the tailgate by second and third clamping cylinders through second and third locators.

2. The gripper for a tailgate of claim 1, wherein the vertical movement means includes:
   a vertical guide rail that is disposed in a vertical direction of the frame;
   a vertical sliding bracket that is disposed to be slidable in a vertical direction on the vertical guide rail through a slider; and
   a vertical electric cylinder that is disposed on the frame in a vertical direction corresponding to one side of the vertical guide rail, wherein the front end of the operating rod thereof is connected to the vertical sliding bracket through a connecting bracket.

3. The gripper for a tailgate of claim 2, wherein the front end of the operating rod of the vertical electric cylinder is connected to the connecting bracket through a floating joint.

4. The gripper for a tailgate of claim 1, wherein the first clamping unit includes:
   a first locator that is mounted at a forward part of a vertical sliding bracket;
   a first clamping cylinder of which one end thereof is connected to a lower side of the first locator through a hinge; and
   a first clamper of which one side is connected to a front end portion of the first locator through a hinge and the other side is connected to a rod front end of the first clamping cylinder through a hinge.

5. The gripper for a tailgate of claim 4, wherein a rotation pad is disposed at a regulation surface of the first locator and the first clamper, and a swivel ball that is rotatable within a predetermined range is mounted in the rotation pad.

6. The gripper for a tailgate of claim 4, wherein the first clamping cylinder is an air pressure cylinder that is operated by air.

7. The gripper for a tailgate of claim 1, wherein the horizontal movement means respectively includes:
   horizontal direction guide rails that are disposed in a horizontal direction at both lower sides of the frame;
   horizontal direction sliding brackets that are respectively slidably disposed on horizontal direction guide rails in a horizontal direction through a slider; and
   horizontal direction electric cylinders that are respectively disposed at upper and lower sides of the frame between the horizontal direction guide rails in a horizontal direction, wherein the front end of each operating rod thereof are respectively connected to the horizontal direction sliding brackets through a connecting bracket.

8. The gripper for a tailgate of claim 7, wherein the front end of each operating rod of the horizontal direction electric cylinders are respectively connected to the connecting bracket through a floating joint.

9. The gripper for a tailgate of claim 1, wherein the second and third clamping units includes:
   second and third locators that are disposed at the forward side of a horizontal direction sliding bracket;
   second and third clamping cylinder of which one end thereof is respectively connected to one side of the second and third locators through a hinge; and
   second and third clampers of which one side thereof is respectively connected to a front end portion of the second and third locators through a hinge and the other side thereof is respectively connected to the front end of a rod of the second and third clamping cylinders by a hinge.

10. The gripper for a tailgate of claim 9, wherein a rotation pad is disposed at a regulation surface of the second and third locators and the second and third clampers, and a swivel ball that is rotatable in a predetermined range is applied in the rotation pad.

11. The gripper for a tailgate of claim 9, wherein the second and third clamping cylinders are air pressure cylinders that are operated by air.

12. The gripper for a tailgate of claim 1, wherein the first clamping cylinder is an air pressure cylinder that is operated by air.

13. The gripper for a tailgate of claim 1, wherein the second and third clamping cylinders are air pressure cylinders that are operated by air.

14. A gripper for a tailgate, comprising:
   a frame;
   a first clamping unit including a first clamper, the first clamping unit being configured so the first clamper regulates an upper portion of a tailgate;
   a vertical movement means operably coupled to the frame and the first clamping unit, the vertical movement means being configured to move the first clamping unit in a vertical direction so that the first clamper regulates the upper portion of a tailgate;
   second and third clamping units that are prepared to be respectively moved in a horizontal direction at both lower sides of the frame through a sliding bracket to make second and third clampers regulate lower sides of the tailgate by second and third clamping cylinders through second and third locators; and
   horizontal movement means operably coupled to the frame and respectively to the second and third clamping units; the horizontal movement means, being configured so as to cause the second and third clamping units to move in a horizontal direction so that the second an third clampers regulate lower sides of the tailgate, wherein the vertical movement means includes a sliding bracket, a guide rail and an electric cylinder, where the sliding bracket moves along the guide rail in the vertical direction by the electric cylinder disposed in an upper portion of the frame.

15. The gripper for a tailgate of claim 14, wherein the frame at a lower portion and rear surface thereof includes a tool mounting portion which is configured for mounting to a tool changer of a robot.

16. The gripper for a tailgate of claim 14, wherein the first clamping unit is arranged so as to be moved in a vertical direction on an upper portion of the frame through the sliding bracket of the vertical movement means to make a first clamper regulate an upper middle of a tailgate by a first clamping cylinder through a first locator.

17. The gripper for a tailgate of claim 14, wherein the horizontal movement means includes a plurality of sliding brackets, a plurality of guide rails and a plurality of electric cylinders, where the horizontal movement means is arranged so each sliding bracket is moved in a horizontal direction along each guide rail by each electric cylinder at both lower sides of the frame.

18. The gripper for a tailgate of claim 17, wherein the second and third clamping units are arranged so as to be respectively moved in a horizontal direction at both lower sides of the frame through each sliding bracket of both horizontal movement means so the second and third clampers regulate lower sides of the tailgate by second and third clamping cylinders through second and third locators.

19. A gripper for a tailgate, comprising:

a frame;

a first clamping unit including a first clamper, the first clamping unit being configured so the first clamper regulates an upper portion of a tailgate;

a vertical movement means operably coupled to the frame and the first clamping unit, the vertical movement means being configured to move the first clamping unit in a vertical direction so that the first clamper regulates the upper portion of a tailgate;

second and third clamping units that are prepared to be respectively moved in a horizontal direction at both lower sides of the frame through a sliding bracket to make second and third clampers regulate lower sides of the tailgate by second and third clamping cylinders through second and third locators; and horizontal movement means operably coupled to the frame and respectively to the second and third clamping units; the horizontal movement means, being configured so as to cause the second and third clamping units to move in a horizontal direction so that the second an third clampers regulate lower sides of the tailgate, wherein the horizontal movement means includes a plurality of sliding brackets, a plurality of guide rails and a plurality of electric cylinders, where the horizontal movement means is arranged so each sliding bracket is moved in a horizontal direction along each guide rail by each electric cylinder at both lower sides of the frame.

20. The gripper for a tailgate of claim 19, wherein the frame at a lower portion and rear surface thereof includes a tool mounting portion which is configured for mounting to a tool changer of a robot.

* * * * *